United States Patent
Kawamura et al.

(10) Patent No.: US 9,822,974 B2
(45) Date of Patent: Nov. 21, 2017

(54) VACUUM PUMP WITH ABATEMENT FUNCTION

(71) Applicant: EBARA CORPORATION, Toyko (JP)

(72) Inventors: Kohtaro Kawamura, Tokyo (JP); Toyoji Shinohara, Tokyo (JP); Tetsuro Sugiura, Tokyo (JP); Hideo Arai, Tokyo (JP); Toshiharu Nakazawa, Tokyo (JP); Keiichi Ishikawa, Tokyo (JP); Seiji Kashiwagi, Tokyo (JP); Yasuhiko Suzuki, Tokyo (JP); Takashi Kyotani, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 0 days.

(21) Appl. No.: 14/226,737

(22) Filed: Mar. 26, 2014

(65) Prior Publication Data

US 2014/0295362 A1    Oct. 2, 2014

(30) Foreign Application Priority Data

Mar. 28, 2013  (JP) .................................. 2013-069728

(51) Int. Cl.
  *F23G 7/06* (2006.01)
  *F23J 13/00* (2006.01)
  (Continued)

(52) U.S. Cl.
  CPC .............. *F23J 13/00* (2013.01); *B01D 53/68* (2013.01); *B01D 53/76* (2013.01); *F04B 37/14* (2013.01);
  (Continued)

(58) Field of Classification Search
  CPC ............ F23G 7/06; F04C 25/02; B01D 53/68
  (Continued)

(56) References Cited

U.S. PATENT DOCUMENTS

| 5,183,646 | A | * | 2/1993 | Anderson | .............. B01D 53/34 422/173 |
| 5,769,626 | A | * | 6/1998 | Hauff | .................... B01D 53/00 417/201 |

(Continued)

FOREIGN PATENT DOCUMENTS

| EP | 1227275 A1 | 7/2002 |
| JP | 09-000861 | 1/1997 |

(Continued)

*Primary Examiner* — Gregory Huson
*Assistant Examiner* — Nikhil Mashruwala
(74) *Attorney, Agent, or Firm* — Baker & Hostetler LLP

(57) ABSTRACT

A vacuum pump includes a vacuum pump having a discharge port to which an abatement part for treating an exhaust gas discharged from the vacuum pump to make the exhaust gas harmless is attached. The vacuum pump includes a cylindrical member having an exhaust gas introduction port for introducing the exhaust gas to be treated and a gas outlet port for discharging gases which have been treated, a plurality of fuel nozzles provided at a circumferential wall of the cylindrical member for ejecting a fuel, and a plurality of air nozzles provided at the circumferential wall of the cylindrical member for ejecting air so as to form a swirling flow of air along an inner circumferential surface of the circumferential wall. The air nozzles are disposed at a plurality of stages spaced in an axial direction of the cylindrical member.

10 Claims, 6 Drawing Sheets

(51) Int. Cl.

| | | |
|---|---|---|
| *F04B 37/14* | (2006.01) | |
| *F04C 25/02* | (2006.01) | |
| *F23G 5/32* | (2006.01) | |
| *F23L 17/00* | (2006.01) | |
| *B01D 53/68* | (2006.01) | |
| *B01D 53/76* | (2006.01) | |

(52) U.S. Cl.
 CPC ............... *F04C 25/02* (2013.01); *F23G 5/32* (2013.01); *F23G 7/065* (2013.01); *F23L 17/00* (2013.01); *B01D 2251/102* (2013.01); *B01D 2257/204* (2013.01); *B01D 2257/553* (2013.01); *B01D 2258/0216* (2013.01); *F04C 2220/30* (2013.01); *F23J 2219/00* (2013.01); *F23J 2900/01007* (2013.01)

(58) Field of Classification Search
 USPC ............................................. 431/253, 353, 5
 See application file for complete search history.

(56) References Cited

U.S. PATENT DOCUMENTS

| | | | |
|---|---|---|---|
| 6,234,787 B1 | 5/2001 | Endoh et al. | |
| 6,432,372 B2* | 8/2002 | Schumacher | B01D 53/74 |
| | | | 239/424 |
| 7,569,193 B2* | 8/2009 | Ferron | B01D 53/34 |
| | | | 422/168 |
| 7,607,914 B2* | 10/2009 | Komai | F23C 5/32 |
| | | | 431/170 |
| 7,819,635 B2* | 10/2010 | Huntley | F04D 19/04 |
| | | | 417/244 |
| 9,182,120 B2* | 11/2015 | Kim | F23G 7/065 |
| 9,364,786 B2* | 6/2016 | Kawamura | B01D 53/343 |
| 2001/0032543 A1* | 10/2001 | Seeley | B01D 53/68 |
| | | | 95/149 |
| 2002/0045141 A1* | 4/2002 | Kim | F23C 7/002 |
| | | | 431/5 |
| 2004/0028590 A1* | 2/2004 | Tsuji | F23D 14/74 |
| | | | 423/245.3 |
| 2004/0191142 A1 | 9/2004 | Takemura et al. | |
| 2005/0135984 A1* | 6/2005 | Ferron | B01D 53/34 |
| | | | 423/245.3 |
| 2008/0262655 A1* | 10/2008 | Smith | G05B 19/4185 |
| | | | 700/247 |
| 2009/0035709 A1* | 2/2009 | Mennie | F23G 7/065 |
| | | | 431/5 |
| 2010/0071548 A1* | 3/2010 | Smith | B01D 53/32 |
| | | | 95/3 |
| 2012/0090338 A1 | 4/2012 | Czerniak et al. | |
| 2014/0106282 A1* | 4/2014 | Kim | F23G 7/065 |
| | | | 431/5 |
| 2014/0295362 A1* | 10/2014 | Kawamura | F23J 13/00 |
| | | | 431/253 |

FOREIGN PATENT DOCUMENTS

| | | |
|---|---|---|
| JP | 2007-218584 A | 8/2007 |
| JP | 2010-201358 A | 9/2010 |
| TW | 315312 B | 9/1997 |
| TW | 201312055 A | 3/2013 |
| WO | WO 2012/017972 A1 | 2/2012 |

* cited by examiner

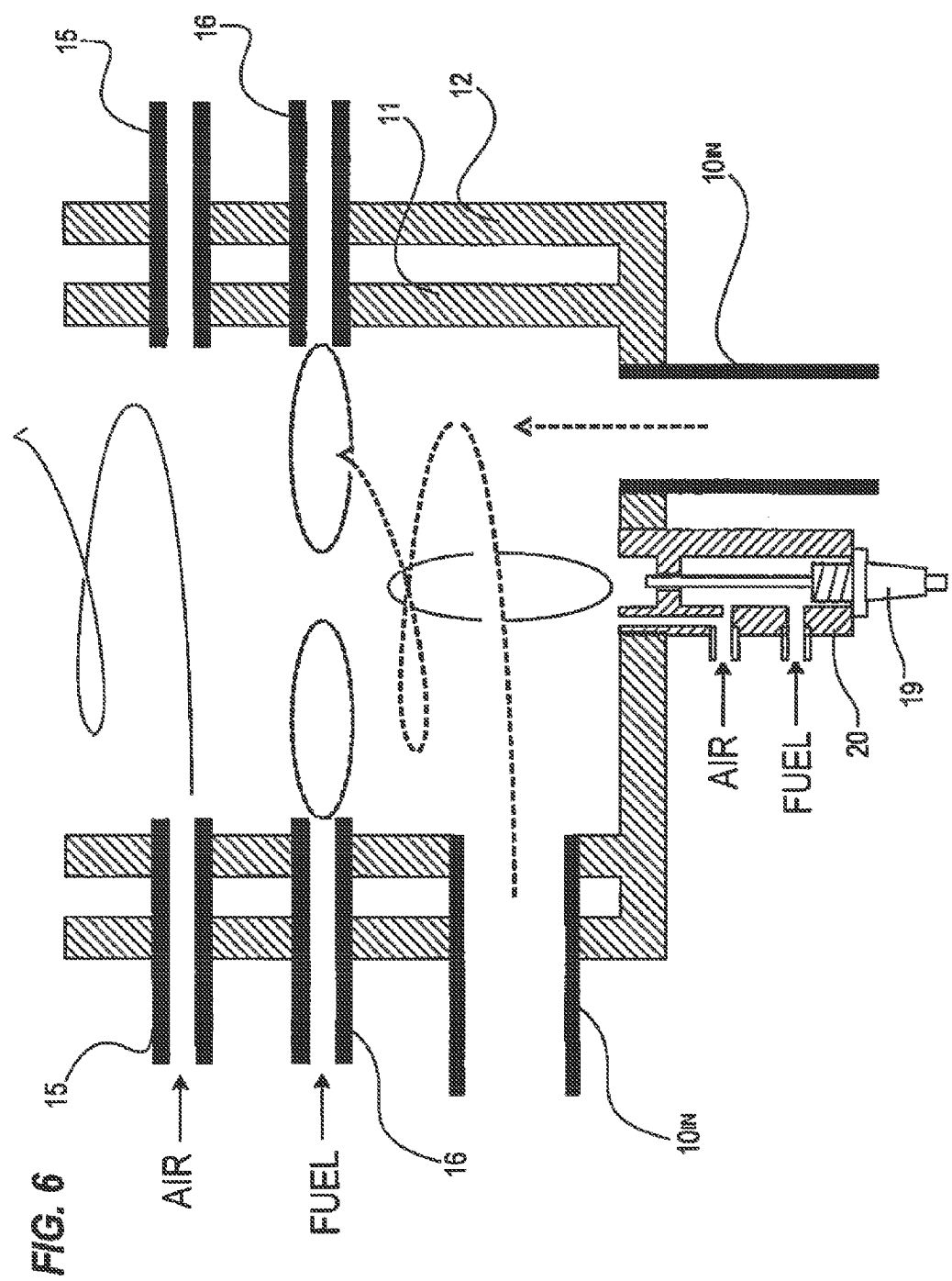

VACUUM PUMP WITH ABATEMENT FUNCTION

CROSS REFERENCE TO RELATED APPLICATION

This application claims priority to Japanese Patent Application No. 2013-069728 filed Mar. 28, 2013, the entire contents of which are hereby incorporated by reference.

BACKGROUND

In a manufacturing process for manufacturing semiconductor devices, liquid crystal panels, LEDs, solar cells or the like, a process gas is introduced into a process chamber which is being evacuated to perform various processes such as an etching process, a CVD process or the like. The process chamber for performing several processes such as an etching process, a CVD process or the like is evacuated by a vacuum pump. Further, the process chamber and exhaust apparatuses connected to the process chamber are cleaned periodically by supplying a cleaning gas thereto. Because exhaust gases such as the process gas, the cleaning gas or the like contain a silane-based gas ($SiH_4$, TEOS or the like), a halogen-based gas ($NF_3$, $ClF_3$, $SF_6$, $CHF_3$ or the like), a PFC gas ($CF_4$, $C_2F_6$ or the like) or the like, such exhaust gases have negative effects on the human member and on the global environment such as global warming. Therefore, it is not preferable that these exhaust gases are emitted to the atmosphere as they are. Accordingly, these exhaust gases are made harmless by an exhaust gas treatment apparatus provided at a downstream side of the vacuum pump, and the harmless exhaust gases are emitted to the atmosphere.

Heretofore, the vacuum pump and the exhaust gas treatment apparatus are housed respectively in individual housings, and hence they are installed in distant positions and connected to each other by a long pipe. Thus, the vacuum pump and the exhaust gas treatment apparatus have not been an optimum system from the standpoint of saving energy by interchanging necessary heat between the vacuum pump and the exhaust gas treatment apparatus. Therefore, a system comprising a vacuum pump and an exhaust gas treatment apparatus which are accommodated in one housing and connected by a short pipe has been developed, and such system has been sold as an integrated-type exhaust system. However, even in such integrated-type exhaust system, the pipe interconnecting the vacuum pump and the exhaust gas treatment apparatus is several meters long, and is kept warm or heated by a heater or the like for preventing a product generated by gas treatment from being attached to the pipe.

In both of the exhaust system wherein the vacuum pump and the exhaust gas treatment apparatus are housed respectively in individual housings and the exhaust system wherein the vacuum pump and the exhaust gas treatment apparatus are housed in one housing, the conventional exhaust gas treatment apparatuses have the following problems:

1) The exhaust gas treatment apparatus employs a premixing burner for premixing a fuel and oxygen and combusting a mixture to generate high-temperature fames for treating an exhaust gas to allowable concentration (TLV: a threshold limit value) or smaller with a small amount of fuel. Therefore, the exhaust gas treatment apparatus requires pure oxygen as a utility.

2) Although the exhaust gas treatment apparatus has a high gas treatment performance by high-temperature flames, a product generated by the gas treatment is melted and solidified, and the melted and solidified product is attached to an interior of a combustor. Therefore, a maintenance periodic cycle becomes short.

3) The exhaust gas treatment apparatus has single-stage swirling air supply nozzles configured primarily to form swirling flows of air in the combustor. The swirling air does not have any other functions.

4) Since the exhaust gas to be treated is combusted in the vicinity of the flames with the exhaust gas retaining a high concentration, the melted and solidified product is liable to be attached to the interior of the combustor. Although the attached product is removed by a scraper, the product that has not removed but has remained is accumulated in the combustor, thus requiring maintenance of the interior of the combustor in a certain periodic cycle.

5) The inflow direction of the exhaust gas to be treated into the combustor and the inflow direction of the swirling air into the combustor are perpendicular to each other to increase the agitation efficiency of the gases in the combustor, thereby efficiently supplying oxygen to the exhaust gas to be treated to combust the exhaust gas quickly in the vicinity of the flames for a high treatment performance. However, the melted product is liable to be attached to the inner surface of the combustor near the flames.

6) The inflow direction of the exhaust gas to be treated is fixed, and the treatment performance is adjusted mainly by art increase or decrease of the fuel.

7) A powder that has been produced by treating the exhaust gas is collected in a tank. When a certain amount of powder is accumulated in the tank, maintenance of the tank is performed to remove the powder or the powder is discharged from the tank with water.

8) The exhaust gas treatment apparatus is purged at all times by a small flow rate of air or nitrogen.

9) After the exhaust gas is combusted and treated, the produced combustion gas is cooled by contact with water.

SUMMARY OF THE INVENTION

The present invention relates to a vacuum pump for use in an exhaust system of a manufacturing apparatus for manufacturing semiconductor devices, liquid crystal panels, LEDs, or the like, and more particularly to a vacuum pump with abatement function which comprises a vacuum pump, for evacuating a chamber of the manufacturing apparatus, to which an abatement function for treating an exhaust gas discharged from the chamber to make the exhaust gas harmless is added.

The present invention has been made in view of the above drawbacks. It is therefore an object of the present invention to provide a vacuum pump with abatement function which can discharge a product, generated by treating an exhaust gas, in a state of powder without causing the byproduct to be melted and attached to an interior of an abatement part by using an air combustion burner that uses air as an oxygen source for combusting a fuel, and by supplying air in a swirling state in an amount for sufficiently diluting the exhaust gas and the fuel, and combusting the exhaust gas and the fuel.

In order to achieve the above object, according to one aspect of the present invention, there is provided a vacuum pump with abatement function, comprising: a vacuum pump having a discharge port to which an abatement part for treating an exhaust gas discharged from the vacuum pump to make the exhaust gas harmless is attached; a cylindrical member having a substantially cylindrical container shape with a dosed end and an open opposite end, wherein the cylindrical member has an exhaust gas introduction port formed at the closed end side and configured to introduce the exhaust gas to be treated, and a gas outlet port formed at the open opposite end side and configured to discharge gases which have been treated; a plurality of fuel nozzles provided at a circumferential wall of the cylindrical member and configured to eject a fuel; and a plurality of air nozzles provided at the circumferential wall of the cylindrical member and configured to eject air so as to form a swirling flow of air along an inner circumferential surface of the circumferential wall, the plurality of air nozzles being disposed at a plurality of stages spaced in an axial direction of the cylindrical member.

According to the present invention, an air combustion burner that uses air as an oxygen source for combusting a fuel is used, and oxygen is supplied by swirling air. Therefore, there is no need to require oxygen as a utility. Further, since only supply of the fuel and the air individually as swirling flows into the combustion chamber is sufficient, the abatement part can be simple in structure.

According to the present invention, since the abatement part has the air nozzles which can supply swirling air in an amount for combusting the fuel and sufficiently diluting the exhaust gas to be treated, the combustion temperature can be suppressed in the range of 700° C. to 1200° C., and the exhaust gas to be treated can be combusted after it is diluted by the swirling air. Consequently, a product generated by treating the exhaust gas is not melted, but is discharged as a powder from the abatement part. Thus, maintenance of the abatement part can be performed with ease in a longer periodic cycle. Further, the product is prevented from being attached (adhered) to the interior of the combustion chamber.

According to a preferred aspect of the invention, the plurality of air nozzles are more distant from the exhaust gas introduction port than the plurality of fuel nozzles.

According to a preferred aspect of the invention, the plurality of fuel nozzles are configured to inject the fuel so as to form a swirling flow of the fuel along the inner circumferential surface of the circumferential wall.

According to a preferred aspect of the invention, the exhaust gas introduction port is positioned in the closed end of the cylindrical member or in the circumferential wall of the cylindrical member, so that the inflow direction of the exhaust gas and the inflow direction of the air are selectable to be parallel to each other or perpendicular to each other.

According to the present invention, the inflow direction of the exhaust gas to be treated and the inflow direction of the swirling air can be properly selected so as to be parallel to each other or perpendicular to each other. By selecting the respective inflow directions of the exhaust gas to be treated and the swirling air suitably, the gases in the combustion chamber are agitated by the swirling air. Then, the gases in the combustion chamber are slowly agitated by the swirling air to combust the exhaust gas to be treated in a wide space of the overall combustion chamber, thereby preventing a product from being attached (adhered) to the combustion chamber.

According to a preferred aspect of the invention, when the inflow direction of the exhaust gas and the inflow direction of the air are selected to be parallel to each other, the inflow direction of the exhaust gas and the inflow direction of the air are selectable to be in the same direction or opposite directions.

According to the present invention, the treatment performance of the abatement part can be changed by selecting the inflow direction of the exhaust gas and the swirling direction of air so as to be in the same direction or opposite directions.

Thus, the gases in the combustion chamber can be agitated into an optimum state by swirling air, and thus an adjusting means for adjusting the treatment performance can be provided while keeping the flow rate of the fuel constant.

According to a preferred aspect of the present invention, the cylindrical member is vertically disposed such that the closed end of the cylindrical member is located at an upper position or a lower position.

According to a preferred aspect of the present invention, when the closed end of the cylindrical member is located at the lower position, the air nozzles at the lowermost stage are directed obliquely downwardly.

According to the present invention, by directing the air nozzles at the lowermost stage downwardly, powder drifts can be prevented from being formed on the bottom of the abatement part. As no powder drifts are formed, the powder generated in the abatement part can be reliably discharged out of the abatement part by the swirling air, and thus the maintenance periodic cycle of the abatement part can be prolonged. In the conventional type for collecting the powder in a tank in the conventional apparatus, for increasing a periodic cycle for maintenance, it has been necessary to employ a large tank for collecting the powder or a discharge mechanism for discharging the powder with water from the task. According to the present invention, such a larger tank or a discharge mechanism is not required. In the conventional apparatus, water is used to cool the exhaust gas. According to the present invention, since the exhaust gas is cooled by air, no water is necessary. Therefore, the water supply utility is unnecessary and the water supply and drainage equipment is also unnecessary.

According to a preferred aspect of the present invention, the abatement part further comprises a plurality of air nozzles provided in the circumferential wall of the cylindrical member at the gas outlet port side and configured to eject air to cool combustion gas.

According to the invention, in addition to the air nozzles for combustion, air nozzles for supplying swirling air to cool the combustion gas after treatment are provided at a downstream side of the abatement part. Specifically, the air nozzles serve to supply cooling air for cooling the combustion gas after treatment. By providing the air nozzles at the downstream side of the abatement part in this manner, the combustion gas after treatment can be cooled to a temperature of about 80° C. or lower by the swirling air.

According to a preferred aspect of the present invention, the air nozzles stop ejecting air upon elapse of a predetermined time after the abatement part stops the exhaust gas treatment operation.

According to the invention, the abatement part stops supplying the swirling air from the air nozzles upon elapse of a predetermined delay time after treatment operation of the abatement part has finished. By providing such delay time, the swirling air purges the gases in the abatement part to expel the acid gas generated in the treatment operation, thereby preventing the components of the abatement part from being corroded or worn.

According to a preferred aspect of the invention, the discharge port of the vacuum pump is branched, the abatement part being attached to each of the branched discharge port.

The present invention offers the following advantages:

(1) The air combustion burner that uses air as an oxygen source for combusting a fuel is used, and the air combustion burner supplies oxygen by swirling air. Therefore, the abatement part does not require oxygen as a utility. Further, since only supply of the fuel and the air individually as swirling flows into the combustion chamber is sufficient, the abatement part can be simple in structure.

(2) Since air in an amount for combusting the fuel and sufficiently diluting the exhaust gas and the fuel can be supplied as swirling air, the combustion temperature can be suppressed to a relatively low temperature. As a concrete example, $SiO_2$, which is a solid product generated when the exhaust gas discharged from a semiconductor manufacturing apparatus is combusted and treated, has a melting point of about 1700° C. If the combustion treatment is performed at a temperature higher than 1700° C., the product is melted and attached to the interior of the burner. According to the present invention, the exhaust gas and the fuel are diluted and combusted, and thus the combustion temperature which does not melt the product can be achieved. Therefore, the product can be discharged as a powder from the combustion chamber, maintenance of the abatement part can be performed with ease in a longer periodic cycle. Further, the product can be prevented from being attached to the interior of the combustion chamber.

(3) Since the product can be discharged as a powder without being melted from the abatement part, the abatement part does not need to have a scraper and various devices for actuating the scraper, and hence can be reduced in size.

(4) The abatement part has the plural-stage of air nozzles for supplying swirling air, and the number of stages of the air nozzles for supplying swirling air can be selected, and the air nozzles for supplying air and the air nozzles for supplying no air can also be selected. Thus, the supply mount of air into the combustion chamber and the supply positions of air into the combustion chamber can be changed. Therefore, the exhaust gas treatment performance can be maintained and the property of by-products that are generated in the combustion chamber can be controlled without the need for devices for controlling the flow rates of the fuel and air.

(5) Since the plural-stage air nozzles are provided, a sufficient amount of swirling air for carrying the powder can be supplied. By the swirling air supplied into the abatement part, the powder generated in the abatement part can be carried to a scrubber in the facility where the vacuum pump is installed, and hence the powder can be prevented from being accumulated (deposited) in the exhaust duct. Therefore, the maintenance load on the customer's exhaust duct can be reduced.

(6) In addition to the air nozzles for combustion, the air nozzles for supplying swirling air to coal combustion gas after treatment are disposed at the downstream side of the abatement part. Therefore, the combustion gas after treatment can be cooled by the swirling air. Consequently, it is not necessary to cool the combustion gas with a water spray or the like.

(7) Since the inflow direction of the exhaust gas to be treated and the inflow direction of the swirling air can be selected so as to be parallel to each other or perpendicular to each other, the gases in the combustion chamber can be slowly agitated by the swirling air to combust the exhaust gas to be treated in a wide space of the overall combustion chamber, thereby preventing a product from being attached to the combustion chamber and performing the optimum combustion treatment according to the property of the exhaust gas.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 6 is a schematic cross-sectional view showing a vacuum pump with abatement function according to still another embodiment of the present invention, and showing the relationship between the inflow direction of the exhaust gas to be treated into the abatement part and the inflow direction of the swirling air from air nozzles into the abatement part.

DETAILED DESCRIPTION OF EMBODIMENTS

Figure 1B:
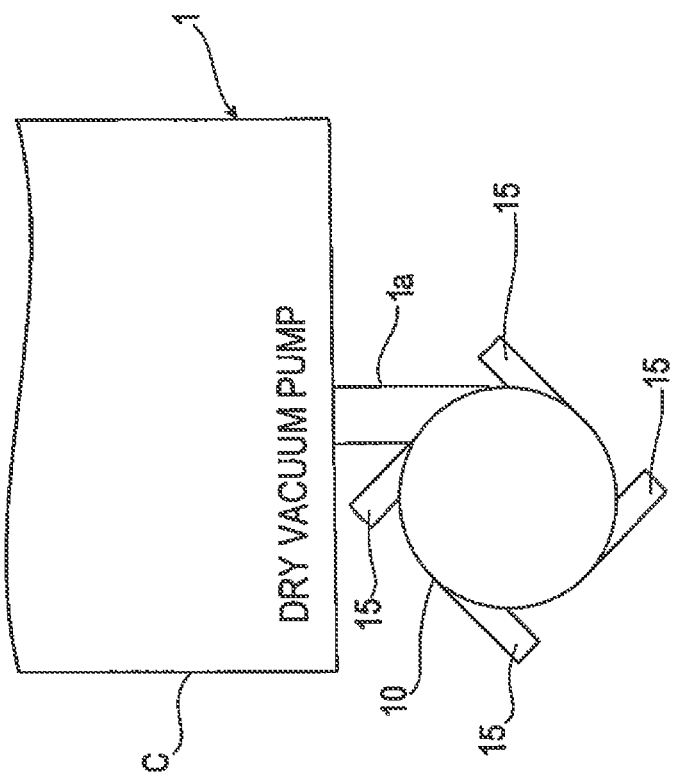
FIG. 1B is a schematic plan view of the vacuum pump shown in FIG. 1A.

A vacuum pump with abatement function according to embodiments of the present invention will be described below with reference to FIGS. 1A through 6. In FIGS. 1A through 6, identical or corresponding parts are denoted by identical or corresponding reference numerals throughout views, and will not be described in duplication.

Figure 1A:
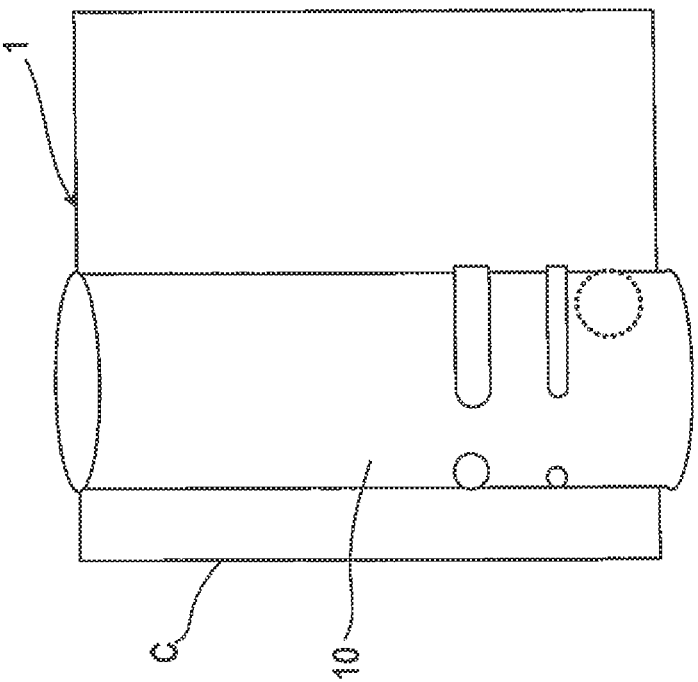
FIG. 1A is a schematic front elevational view showing a configuration example of a vacuum pump with abatement function according to an embodiment of the present invention.

FIGS. 1A and 1B are views showing a configuration example of a vacuum pump with abatement function according to the present invention. FIG. 1A is a schematic front view of the vacuum pump with abatement function, and FIG. 1B is a schematic plan view of the vacuum pump with abatement function.

As shown in FIGS. 1A and 1B, a vacuum pump with abatement function according to the present invention has a configuration wherein an abatement part 10 is attached to a discharge port 1a of a vacuum pump 1. The vacuum pump 1 may comprise a single dry vacuum pump or two dry vacuum pumps connected in series. The single dry vacuum pump or the two dry vacuum pumps comprise a roots-type dry vacuum pump, a screw-type dry vacuum pump, or the like which is well known in the art and will not be shown and described in detail below. In FIGS. 1A and 1B, the vacuum pump 1 is illustrated as a vacuum pump having a housing C.

Figure 2B:
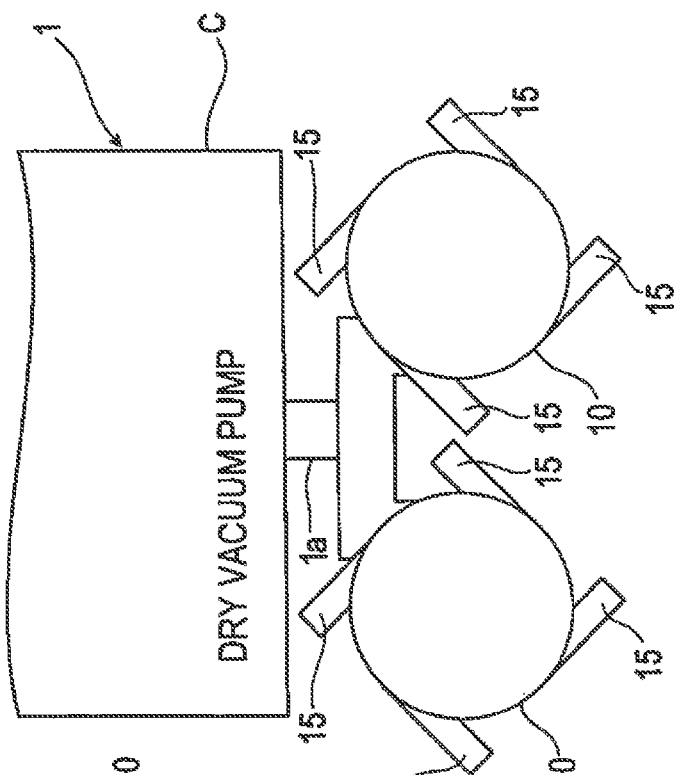
FIG. 2B is a schematic plan view of the vacuum pump shown in FIG. 2A.
Figure 2A:
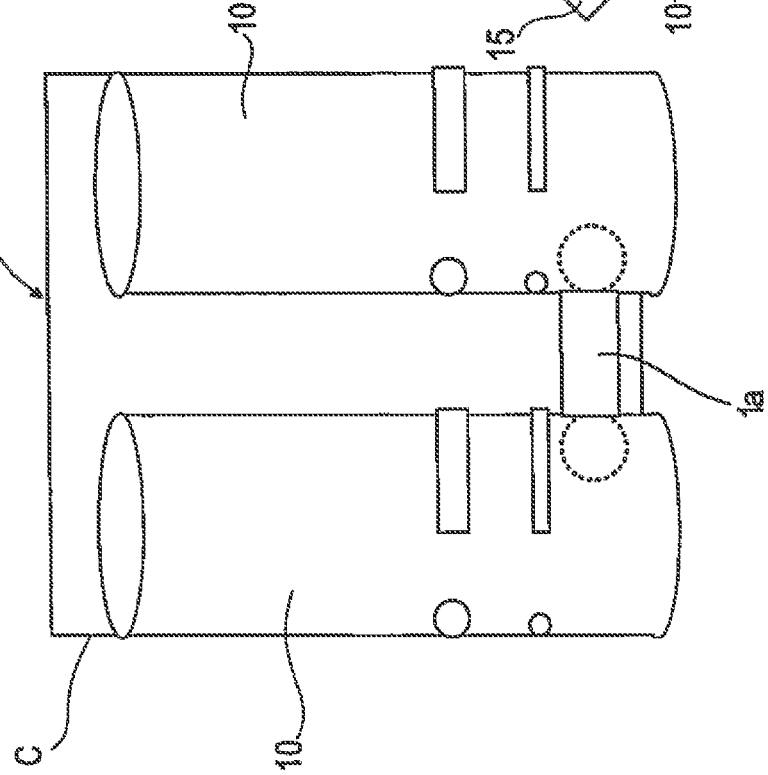
FIG. 2A is a schematic front elevational view showing another configuration example of a vacuum pump with abatement function according to the embodiment of the present invention.

FIGS. 2A and 2B are views showing another configuration example of a vacuum pump with abatement function according to the present invention. FIG. 2A is a schematic front view of the vacuum pump with abatement function, and FIG. 2B is a schematic plan view of the vacuum pump with abatement function. As shown in FIGS. 2A and 2B, a vacuum pump with abatement function according to the present invention has a configuration wherein two abatement parts 10, 10 are attached to respective portions branched from the discharge port 1a of the vacuum pump 1.

Figure 3:
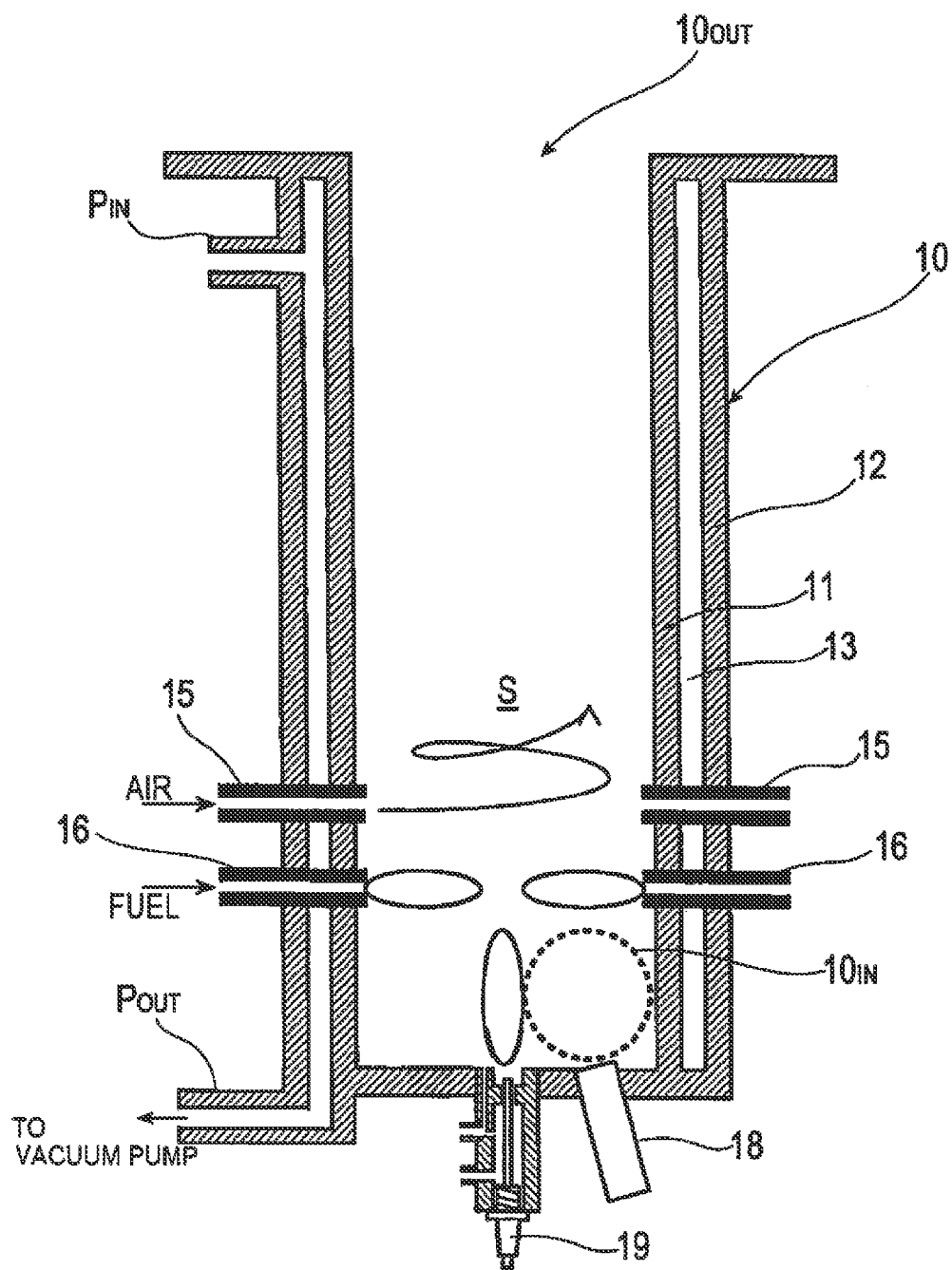
FIG. 3 is a cross-sectional view showing a configuration of an abatement part of the vacuum pump with abatement function.

FIG. 3 is a schematic cross-sectional view showing a configuration of the abatement part 10 of the vacuum pump with abatement function. As shown in FIG. 3, the abatement part 10 is composed of a cylindrical container as a whole. The cylindrical container-shaped abatement part 10 is disposed in a vertical direction so that its central axis extends in a vertical direction. The abatement part 10 comprises a cylindrical member 11 which has a bottom and forms a combustion chamber S therein for forming flames by a burner and combusting an exhaust gas, and an outer cylinder 12 provided so as to surround the cylindrical member 11 with a predetermined distance therebetween.

A warming chamber 13 for holding and warming an $N_2$ gas is formed between the cylindrical member 11 and the outer cylinder 12. The $N_2$ gas flows into the warming chamber 13 from an inlet port $P_{IN}$ provided at an upper part of the outer cylinder 12 and flows out from an outlet port $P_{OUT}$ provided at a lower part of the outer cylinder 12. The $N_2$ gas warmed in the warming chamber 13 can be supplied to the vacuum pump 1.

A gas introduction port $10_{IN}$ for introducing the exhaust gas to be treated into the combustion chamber is formed at a lower part of a circumferential wall of the abatement part 10. A gas outlet $10_{OUT}$ for discharging the gases after treatment is formed at the upper end of the abatement part 10. A plurality of air nozzles 15 for supplying air into the combustion chamber S and a plurality of fuel nozzles 16 for supplying a fuel into the combustion chamber S are provided in the abatement part 10, As shown in FIGS. 1 and 2, the air nozzles 15 extend at a predetermined angle to the tangential direction of the abatement part 10 to blow of air so as to form swirling flows along an inner circumferential surface of the circumferential wall of the cylindrical member 11. Similarly, the fuel nozzles 16 extend at a predetermined angle to the tangential direction of the cylindrical member 11 to blow of the fuel so as to form swirling flows along the inner circumferential surface of the circumferential wall of the cylindrical member 11. The air nozzles 15 and the fuel nozzles 16 are disposed respectively at predetermined intervals in the circumferential direction of the cylindrical member 11. A UV sensor 18 for detecting flames and a plug 19 for ignition are provided on the bottom of the cylindrical member 11.

Figure 4:
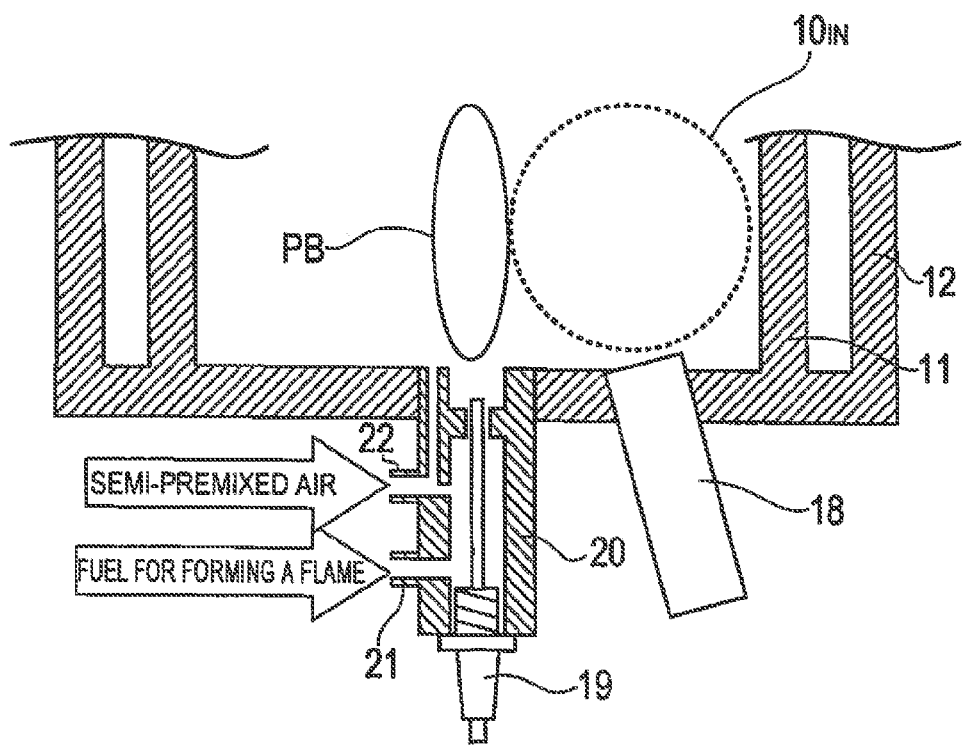
FIG. 4 is an enlarged cross-sectional view showing essential parts of FIG. 3.

FIG. 4 is an enlarged view of FIG. 3. As shown in FIG. 4, the plug 19 is provided on the bottom of the cylindrical member 11, and a cylindrical pilot burner part 20 is provided so as to surround the plug 19. A fuel supply port 21 for supplying a fuel for forming a flame and an air supply port 22 for supplying semi-premixed air are formed in the pilot burner part 20. Thus, a pilot burner flame PB is formed by igniting the fuel supplied from the fuel supply port 21 with the plug 19.

Next, operation of the abatement part 10 shown in FIGS. 3 and 4 will described.

The fuel is blown off from the plural fuel nozzles 16 provided in the abatement part 10 toward the combustion chamber S so as to form the swirling flows. Further, air is blown off from the plural air nozzles 15 toward the combustion chamber S so as to form the swirling flows. Then, the mixture gas of fuel and air is ignited by the pilot burner flame PB, and thus the swirling flows of flames (swirling flames) are formed along the inner circumferential surface of the cylindrical member 11.

On the other hand, the exhaust gas to be treated is blown off toward the combustion chamber S from the exhaust gas introduction port $10_{IN}$ which opens on the inner circumferential surface of the cylindrical member 11. The blown-off exhaust gas mixes with the swirling flames of the mixture gas and is combusted. At this time, because the fuel is blown off from all the fuel nozzles 16 provided in the circumferential direction of the cylindrical member 11 so as to swirl intensely in one direction, combustion efficiency of the exhaust gas becomes high. Further, since the air ejected from the air nozzles 15 is also swirling, while the air flows mix with the flames to accelerate the swirling flows of the flames, the exhaust gas is oxidatively decomposed.

The treated gas is discharged from the gas outlet $10_{OUT}$ at the upper end of the abatement part 10, and is then discharged to the customer's exhaust duct.

According to the present invention, as described above, the air combustion burner that uses air as an oxygen source for combusting a fuel is used, and oxygen is supplied into the combustion chamber by the swirling air. Therefore, oxygen is not required as a utility. Further, since only supply of the fuel and the air individually as swirling flows into the combustion chamber S is sufficient, the abatement part 10 can be simple in structure.

According to the present invention, because the air nozzles 15 which can supply swirling air in an amount for combusting the fuel and sufficiently diluting the exhaust gas to be treated are provided, the combustion temperature can be suppressed in the range of 70° C. to 1200° C., and the exhaust gas to be treated can be combusted after it is diluted by the swirling air. Consequently, a product generated when the exhaust gas is combusted can be discharged as a powder without being melted from the abatement part 10. Thus, maintenance of the abatement part 10 becomes easy and a maintenance periodic cycle can be prolonged. Further, the product can be prevented from being attached to the combustion chamber S.

Heretofore, since the melted product is attached to and deposited on the inner wall surface of the combustion chamber, it has been customary to employ a scraper to scrape the attached and deposited materials from the inner wall surface of the combustion chamber. According to the present invention, since the product is not melted, but can be discharged as a powder from the abatement part 10, the scraper and various devices for actuating the scraper are not required to be installed, and hence the abatement part 10 can be reduced in size.

Figure 5:
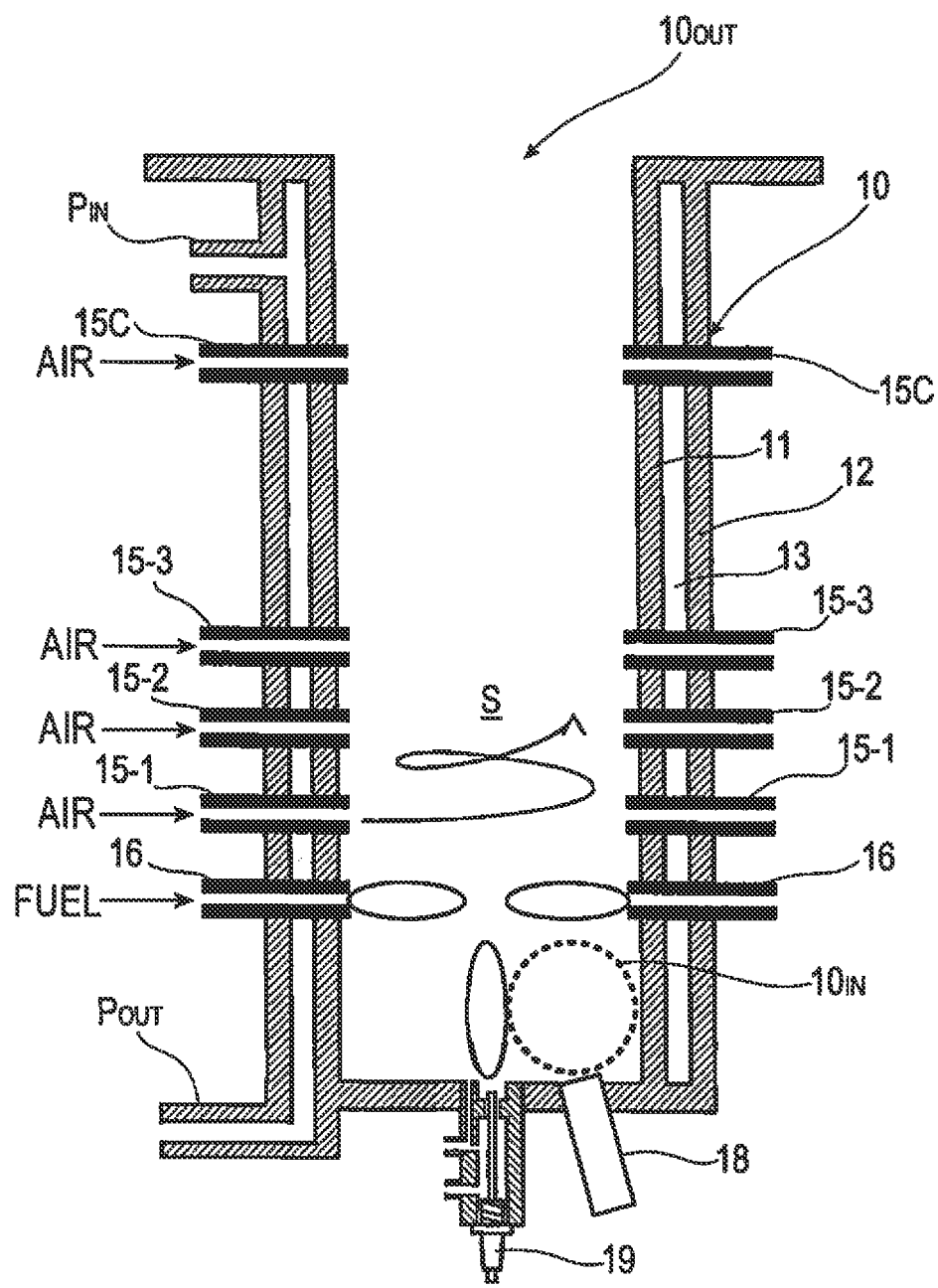
FIG. 5 is a schematic cross-sectional view showing a vacuum pump with abatement function according to another embodiment of the present invention, and showing a configuration having air nozzles for supplying swirling air into the combustion chamber at a plurality of stages.

FIG. 5 is a schematic cross-sectional view showing a vacuum pump with abatement function according to another embodiment of the present invention, and showing a configuration having air nozzles for supplying swirling air into the combustion chamber S at a plurality of stages. As shown in FIG. 5, the abatement part 10 has air nozzles 15-1, 15-2, 15-3 disposed at a plurality of stages spaced in a vertical direction of the abatement part 10. In the illustrated example, the three stage air nozzles are exemplified, but the two-stage air nozzles or the four or more-stage air nozzles may be disposed. As with the air nozzles 15 shown in FIG. 3, the air nozzles 15-1, 15-2, 15-3 at the respective stages extend at a predetermined angle to the tangential direction of the abatement part 10 to blow off air to form swirling flows in the combustion chamber S. The air nozzles 15-1, 15-2, 15-3 at the respective stages are disposed at predetermined intervals in the circumferential direction of the cylindrical member 11. Other structural details of the abatement part. 10 shown in FIG. 5 are identical to those of the abatement part 10 shown in FIG. 3.

According to the embodiment shown in FIG. 5, the plural-stage air nozzles 15-1, 15-2, 15-3 for supplying swirling air are provided, oxygen is supplied by swirling air from the air no les 15-1, 15-2, 15-3 at the respective stages. In this case, of the plural-stage air nozzles 15-1, 15-2, 15-3, the number of stages of the air nozzles for supplying swirling air can be selected, and the air nozzles for supplying aft and the air nozzles for supplying no air can also be selected, thereby changing the supply positions of air into the combustion chamber S.

With the above arrangement, the property of the product generated in the combustion chamber S can be controlled by changing the number of supply stages of air and the supply positions of air, without the need for devices for controlling the flow rates of fuel and air. The speed for combusting the exhaust gas to be treated is adjusted by causing the supply position of swirling air to be close to or away from the flames in the combustion chamber S. Specifically, if the exhaust gas is combusted in an area near the flames where the temperature is 1500° C. or higher, the product becomes in the form of large particles. If the exhaust gas is combusted in an area remote from the flames where the temperature is around 1000° C., the product becomes in the form of The powder.

According to the present invention, since the plural stages of the air nozzles 15-1, 15-2, 15-3 are provided so as to supply swirling air in an amount for combusting the fuel and sufficiently diluting the exhaust gas to be treated, the combustion temperature can be suppressed in the range of 700° C. to 1200° C., and the exhaust gas to be treated can be combusted after it is diluted by the swirling air. Consequently, a product generated when the exhaust gas is combusted can be discharged as a powder without being melted from the abatement part 10. Thus, maintenance of the abatement part 10 becomes easy and a maintenance periodic cycle can be prolonged. Further, the product can be prevented from being attached to the combustion chamber S.

According to the present invention, because the plural stages of the air nozzles 15-1, 15-2, 15-3 are provided, a sufficient amount of swirling air for carrying the powder can be supplied. Then, the supplied swirling air is capable of purging the exhaust duct provided at the subsequent stage of the outlet of the abatement part 10. The swirling air introduced into the abatement part 10 cantles the powder generated in the abatement part 10 to a scrubber in the facility, without deposing the powder in the exhaust duct Therefore, the maintenance load of the customer's exhaust duct can be reduced. If the powder generated in the abatement part 10 is fully carried to the scrubber, the load on the scrubber can be estimated from the amount of the exhaust gas, so that the periodic cycle for maintenance of the scrubber can be determined systematically according to the plan.

Normally, the exhaust duct is clogged irregularly, and large-scale maintenance is required to identify the clogging location and to clean the exhaust duct. According to the present invention, since a sufficient amount of air can be flowed from the abatement part 10 into the exhaust duct, the exhaust duct can be prevented from being clogged.

In the embodiment shown in FIG. 5, the air nozzles 15-1 at the lowermost stage can be directed downwardly to prevent powder drifts from being formed on the bottom of the abatement part 10. As no powder drifts are formed, the powder generated in the abatement part 10 can be reliably discharged out of the abatement part 10 by the swirling air. As a result, the maintenance periodic cycle of the abatement part 10 can be prolonged. In the conventional type for collecting the powder in a tank in the conventional apparatus, in order to increase a periodic cycle for maintenance, it has been necessary to employ a large tank for collecting the powder or a discharge mechanism for discharging the powder with water from the tank. According to the present invention, such a larger tank or a discharge mechanism is not required. Further, in the conventional apparatus, water has been used to cool the exhaust gas. According to the present invention, since the exhaust gas is cooled by air, no water is necessary. Therefore, the water supply utility is unnecessary and the water supply and drainage equipment is also unnecessary.

According to the embodiment shown in FIG. 5, in addition to the air nozzles 15-1, 15-2, 15-3 for combustion, air nozzles 15C for supplying swirling air to cool the combustion gas after treatment are disposed at a downstream side of the abatement part 10. Specifically, the air nozzles 15C serve to supply air for cooling the combustion gas after treatment. By providing the air nozzles 15C at the downstream side of the abatement part 10, the combustion gas after treatment can be cooled to a temperature of about 80° C. or lower by swirling air.

FIG. 6 is a schematic cross-sectional view showing a vacuum pump with abatement function according to still another embodiment of the present invention, and showing the relationship between the inflow direction of the exhaust gas to be treated into the abatement part 10 and the inflow direction of the swirling air from the air nozzles 15 into the abatement part 10. In FIG. 6, the UV sensor 18 is omitted from illustration.

In FIG. 6, as shown by bold solid lines, an exhaust gas introduction port $10_{IN}$ for introducing the exhaust gas to be treated into the abatement part 10 is open on the inner circumferential wall surface of the cylindrical member 11. The inflow direction of the exhaust gas from the exhaust gas introduction port $10_{IN}$ is parallel to the inflow direction of the swirling air from the air nozzles 15. Further, as shown by bold solid lines, an exhaust gas introduction port $10_{IN}$ for introducing the exhaust gas to be treated into the abatement part 10 is open on the bottom portion of the cylindrical member 11. The inflow direction of the exhaust gas from the exhaust gas introduction port $10_{IN}$ is perpendicular to the inflow direction of swirling air from the air nozzles 15. The exhaust gas introduction port $10_{IN}$ may selectively be provided in the circumferential wall of the cylindrical member 11 or the bottom portion of the cylindrical member 11.

According to the present invention, the inflow direction of the exhaust gas to be treated and the inflow direction of the swirling air can be properly selected so as to be parallel to each other or perpendicular to each other. By selecting the respective inflow directions of the exhaust gas to be treated and the swirling sir suitably, the gases in the combustion chamber are agitated by the swirling air. Then, the gases in the combustion chamber S are slowly agitated by the swirling air to combust the exhaust gas to be treated in a wide space of the overall combustion chamber S, thereby preventing a product from being attached to the combustion chamber. The inflow direction of the exhaust gas greatly affects the agitation efficiency in the combustion chamber, and is directly reflected in the combustion velocity. If the combustion velocity is lowered to prevent a solid product from being attached to the combustion chamber, then maintenance of the abatement past 10 is scarcely required, except for periodic replacement of expendable parts such as O-rings, UV tubes, ignition plugs, etc.

Further, in the case where the exhaust gas introduction port $10_{IN}$ is open on the inner circumferential surface of the cylindrical member 11 to allow the inflow direction of the exhaust gas to be treated to be parallel to the inflow direction of the swirling air, the exhaust gas to be treated and the swirling air can flow into the combustion chamber so as to be swirled in the same direction or opposite directions. The treatment performance of the abatement part 10 can be changed by selecting the inflow direction of the exhaust gas and the swirling direction of air so as to be in the same direction or opposite directions. Thus, the swirling air agitates the gases in the combustion chamber into an optimum state, thereby providing an adjusting means for adjusting the treatment performance while keeping the flow rate of the fuel constant.

If the range of the flow rate of the fuel capable of stable combustion has to be limited due to the specifications of the air combustion burner, normally, it is necessary to provide specially designed components for changing the flow rate of the fuel. According to the present invention, as described above, the treatment performance can be adjusted by a simple means for selecting the inflow direction of the exhaust gas, rather than an adjusting means for changing the flow rate of the fuel. Thus, there is no need for specially designed components.

In the abatement part 10, an acid gas is generated depending on the type of the exhaust gas to be treated, and water is also generated by combusting the fuel. In the case where the abatement part 10 stops supplying the fuel and also stops supplying the swirling air at the time when the treatment operation of the abatement part 10 is finished, the generated water condenses and the acid gas is dissolved into the condensed water, possibly corroding components of the abatement part 10 quickly.

Therefore, according to the present invention, the abatement part 10 stops supplying the swirling air from the air nozzles upon elapse of a predetermined delay time after treatment operation of the abatement part 10 has finished. By providing such delay time, the swirling air purges the gases in the abatement part 10 to expel the acid gas generated in the treatment operation, thereby preventing the components of the abatement part 10 from being corroded or worn.

Although the preferred embodiments of the present invention have been described above, it should be understood that the present invention is not limited to the above embodiments, but various changes and modifications may be made to the embodiments without departing from the scope of the appended claims.

What is claimed is:

1. A vacuum pump with abatement function, comprising:
a vacuum pump having a discharge port; and
at least one abatement part for treating an exhaust gas discharged from the vacuum pump to make the exhaust gas harmless, the at least one abatement part directly attached to the discharge port of the vacuum pump, the at least one abatement part comprising:
a cylindrical member having a substantially cylindrical container shape with a closed end and an open opposite end, wherein the cylindrical member has a single combustion chamber therein, an exhaust gas introduction port formed in the closed end and configured to introduce the exhaust gas to be treated into the single combustion chamber, and a gas outlet port formed in the open opposite end and configured to discharge gases which have been treated from the single combustion chamber,
a plurality of fuel nozzles provided in a circumferential wall of the cylindrical member and configured to eject a fuel, and
a plurality of air nozzles provided in the circumferential wall of the cylindrical member and configured to eject air so as to form a swirling flow of air along an inner circumferential surface of the circumferential wall, the plurality of air nozzles provided in the circumferential wall of the cylindrical member being disposed at a plurality of stages spaced in an axial direction of the cylindrical member,
wherein the plurality of fuel nozzles, and the plurality of air nozzles disposed at the plurality of stages are spaced in the axial direction of the cylindrical member so that the fuel ejected from the plurality of fuel nozzles and the air ejected from the plurality of air nozzles are mixed and ignited to form swirling flames in the single combustion chamber along the inner circumferential surface of the cylindrical member, and the exhaust gas introduced from the exhaust gas introduction port is mixed with the swirling flames and is treated by combustion in the single combustion chamber.

2. The vacuum pump with abatement function according to claim 1, wherein the plurality of air nozzles are more distant from the exhaust gas introduction port than the plurality of fuel nozzles.

3. The vacuum pump with abatement function according to claim 1, wherein the plurality of fuel nozzles are configured to inject the fuel so as to form a swirling flow of the fuel along the inner circumferential surface of the circumferential wall.

4. The vacuum pump with abatement function according to claim 1, wherein the exhaust gas introduction port is positioned in the closed end of the cylindrical member or in the circumferential wall of the cylindrical member, so that the inflow direction of the exhaust gas and the inflow direction of the air are selectable to be parallel to each other or perpendicular to each other.

5. The vacuum pump with abatement function according to claim 4, wherein when the inflow direction of the exhaust gas and the inflow direction of the air are selected to be parallel to each other, the inflow direction of the exhaust gas and the inflow direction of the air are selectable to be in the same direction or opposite directions.

6. The vacuum pump with abatement function according to claim 1, wherein the cylindrical member is vertically disposed such that the closed end of the cylindrical member is located at an upper position or a lower position.

7. The vacuum pump with abatement function according to claim 6, wherein when the closed end of the cylindrical member is located at the lower position, the air nozzles at a lowermost stage are directed downwardly.

8. The vacuum pump with abatement function according to claim 1, further comprising:
a plurality of air nozzles provided in the circumferential wall of the cylindrical member at the gas outlet port side and configured to eject air to cool combustion gas.

9. The vacuum pump with abatement function according to claim 1, wherein the air nozzles stop ejecting air upon elapse of a predetermined time after the abatement part stops the exhaust gas treatment operation.

10. The vacuum pump with abatement function according to claim 1, wherein the discharge port of the vacuum pump is branched, the abatement part being attached to each of the branched discharge port.

* * * * *